(12) United States Patent
Satoi

(10) Patent No.: US 10,449,808 B2
(45) Date of Patent: Oct. 22, 2019

(54) PNEUMATIC TIRE

(71) Applicant: TOYO TIRE & RUBBER CO., LTD., Osaka-shi, Osaka (JP)

(72) Inventor: Aya Satoi, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 169 days.

(21) Appl. No.: 15/342,578

(22) Filed: Nov. 3, 2016

(65) Prior Publication Data

US 2017/0129288 A1 May 11, 2017

(30) Foreign Application Priority Data

Nov. 5, 2015 (JP) .................................. 2015-217870

(51) Int. Cl.
*B60C 11/12* (2006.01)
*B60C 11/03* (2006.01)

(52) U.S. Cl.
CPC ...... *B60C 11/1218* (2013.01); *B60C 11/0304* (2013.01); *B60C 11/0306* (2013.01);
(Continued)

(58) Field of Classification Search
CPC . B60C 11/12; B60C 11/1218; B60C 11/1281; B60C 2011/1209
See application file for complete search history.

(56) References Cited

U.S. PATENT DOCUMENTS

| 2008/0295937 A1* | 12/2008 | Ohashi | ................... | B60C 11/12 |
| | | | | 152/209.21 |
| 2009/0050248 A1* | 2/2009 | Ohashi | ................... | B60C 11/12 |
| | | | | 152/209.18 |

(Continued)

FOREIGN PATENT DOCUMENTS

| JP | 2007-8303 A | 1/2007 |
| JP | 2013-79015 A | 5/2013 |
| JP | 2013-79017 A | 5/2013 |

OTHER PUBLICATIONS

Office Action dated May 21, 2018, issued in Chinese application No. 201610964943.5 (counterpart to U.S. Appl. No. 15/342,437), with English translation. (5 pages).

(Continued)

*Primary Examiner* — Jodi C Franklin
(74) *Attorney, Agent, or Firm* — Westerman, Hattori, Daniels & Adrian, LLP

(57) ABSTRACT

In a pneumatic tire, a tread rubber includes a vehicle inner side region, a vehicle outer side region, first stereoscopic sipes, and second stereoscopic sipes. The first stereoscopic sipe has a sipe wall surface of a shape bent in a sipe width direction as viewed in cross section perpendicular to a sipe length direction, the first stereoscopic sipe having a fixed sipe width over a sipe depth direction. The second stereoscopic sipe has large width portions having a sipe width wider than a sipe width of the second stereoscopic sipe on a surface of the tread rubber in the inside of the tread rubber. Rubber hardness of the tread rubber in the vehicle outer side region is larger than rubber hardness of the tread rubber in the vehicle inner side region. Accordingly, it is possible to enhance dry steering stability performance while suppressing lowering of ice braking performance.

10 Claims, 9 Drawing Sheets

(52) U.S. Cl.
CPC ...... *B60C 11/1236* (2013.01); *B60C 11/1281* (2013.01); *B60C 2011/0346* (2013.01); *B60C 2011/0381* (2013.01); *B60C 2011/1213* (2013.01); *B60C 2011/1227* (2013.01); *B60C 2011/1286* (2013.01); *B60C 2011/1295* (2013.01)

(56) References Cited

U.S. PATENT DOCUMENTS

2009/0078350 A1* 3/2009 Ohashi .................. B60C 11/12
　　　　　　　　　　　　　　　　　　　　　　152/209.18
2013/0081744 A1　　4/2013 Kameda et al.

OTHER PUBLICATIONS

Office Action dated Jun. 21, 2018, issued in counterpart Chinese application No. 201610965771.3, with English translation. (9 pages).
Notice of Allowance and Fees Due dated Oct. 17, 2018, issued in U.S. Appl. No. 15/342,437 (14 pages).

\* cited by examiner

[Fig.1]
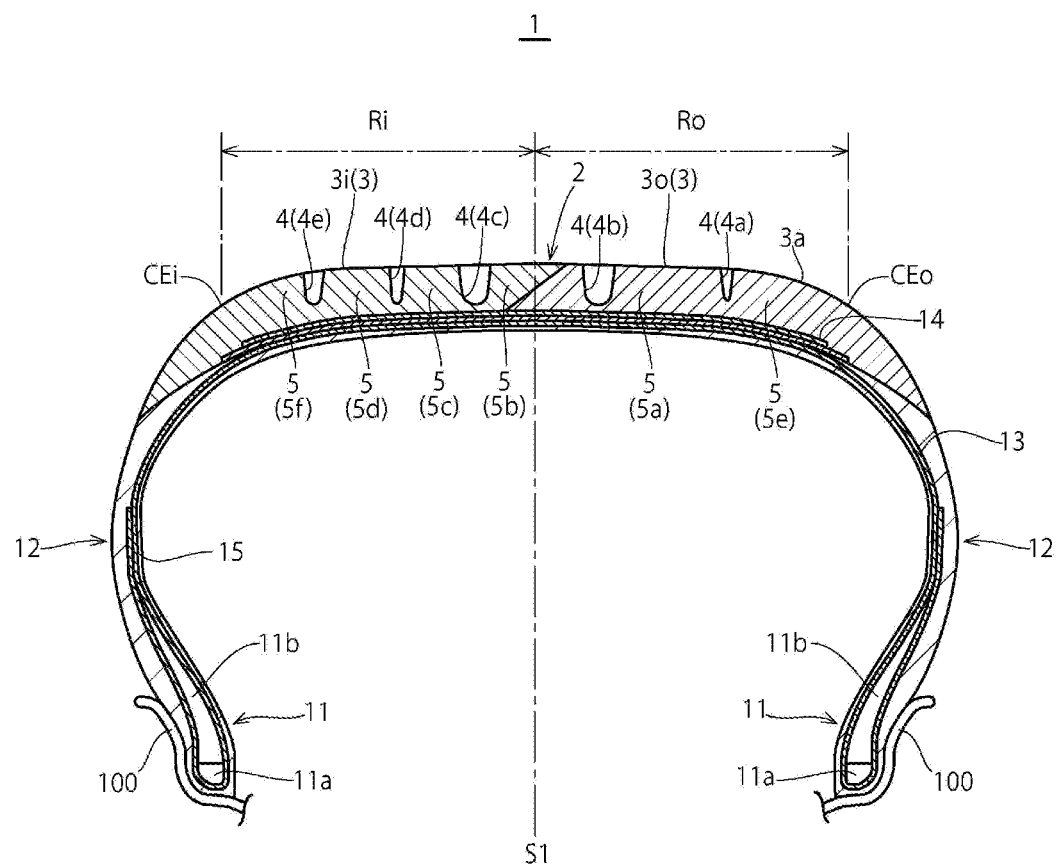

[Fig.2]
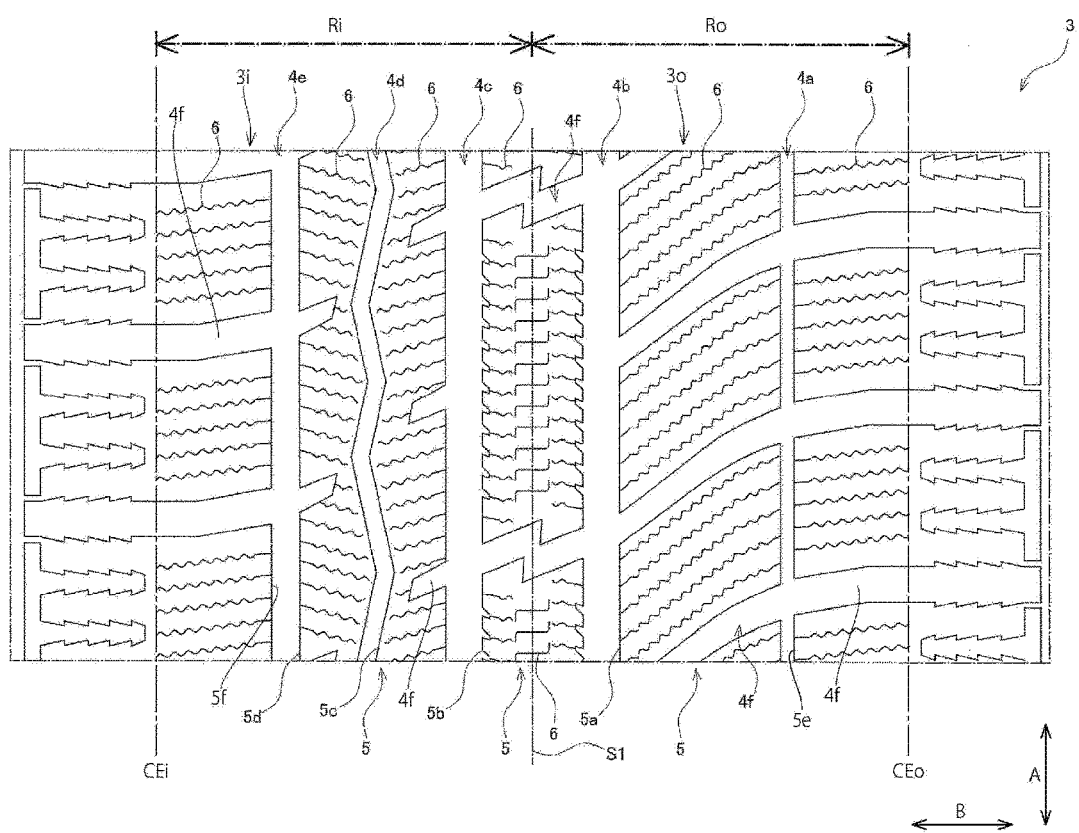

[Fig.3]
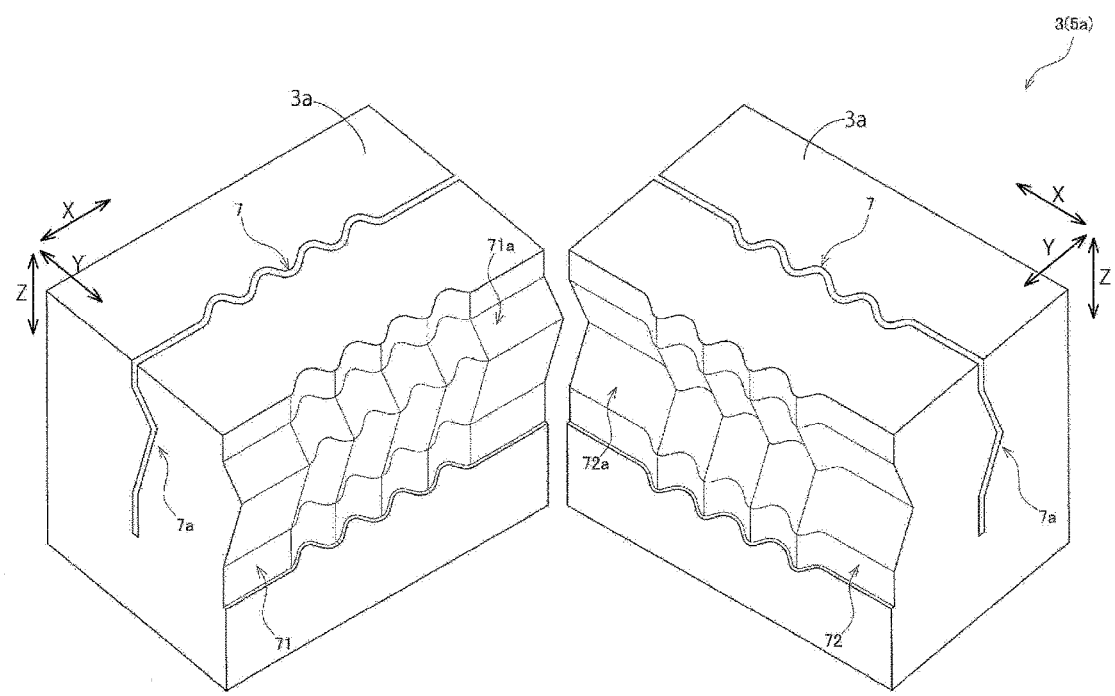

[Fig.4]
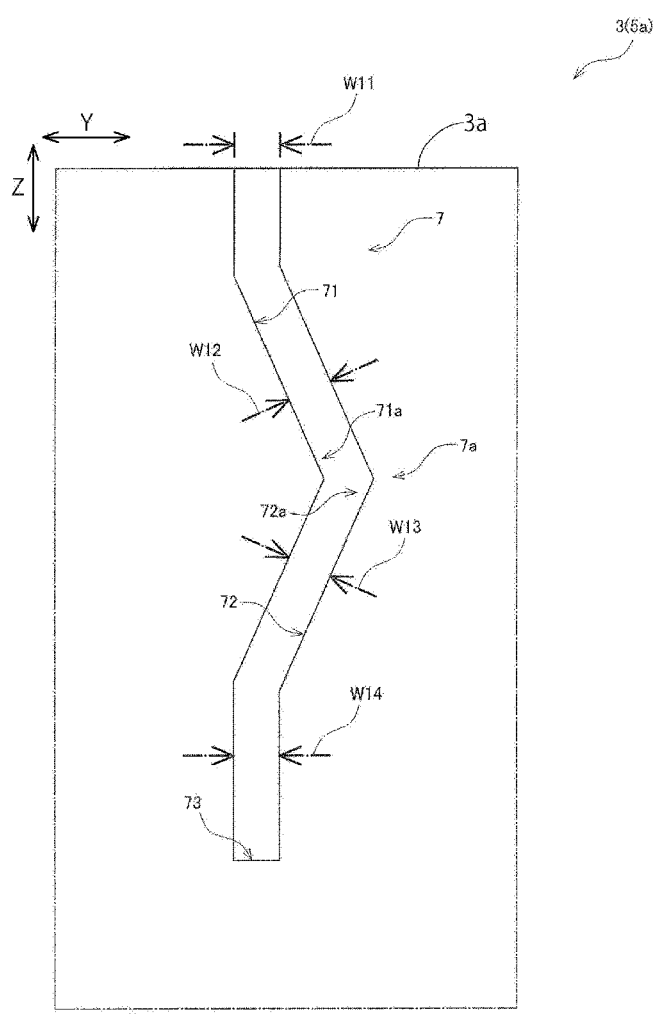

[Fig.5]
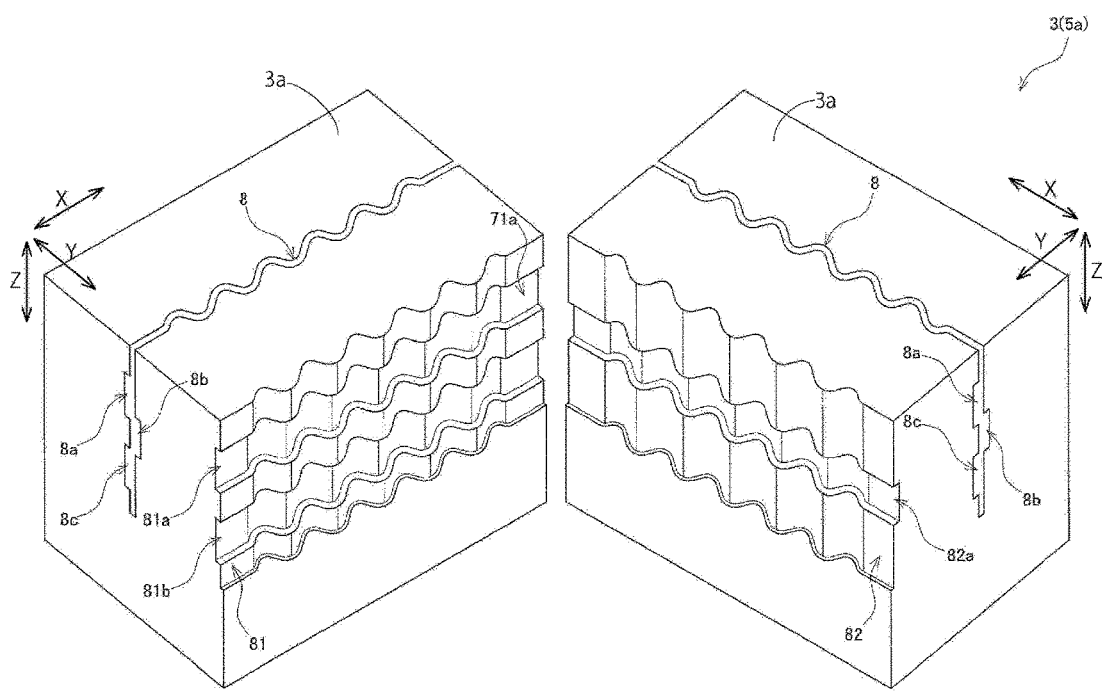

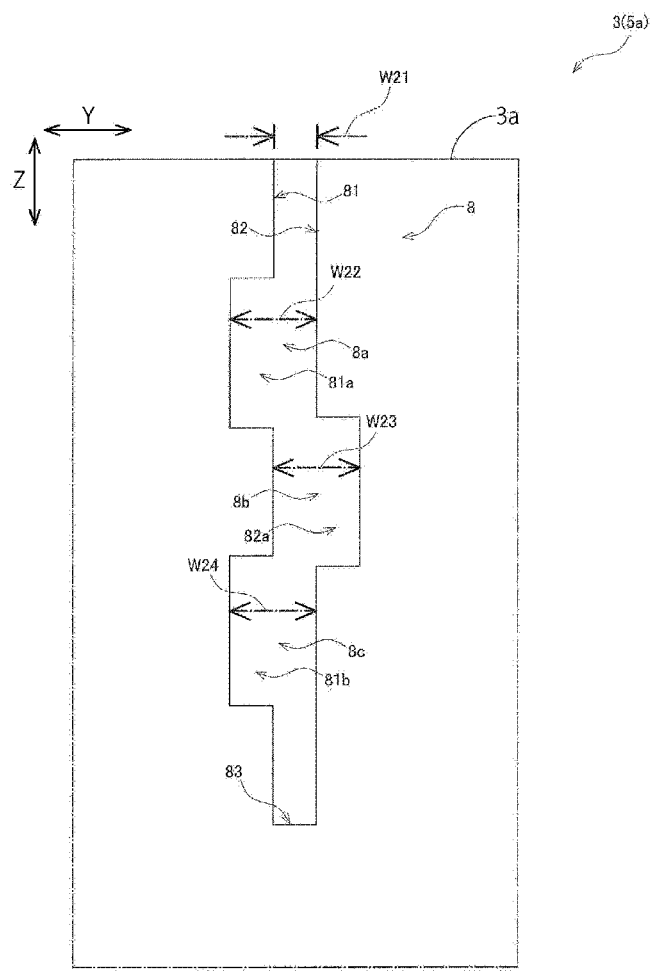
[Fig.6]

[Fig.7]
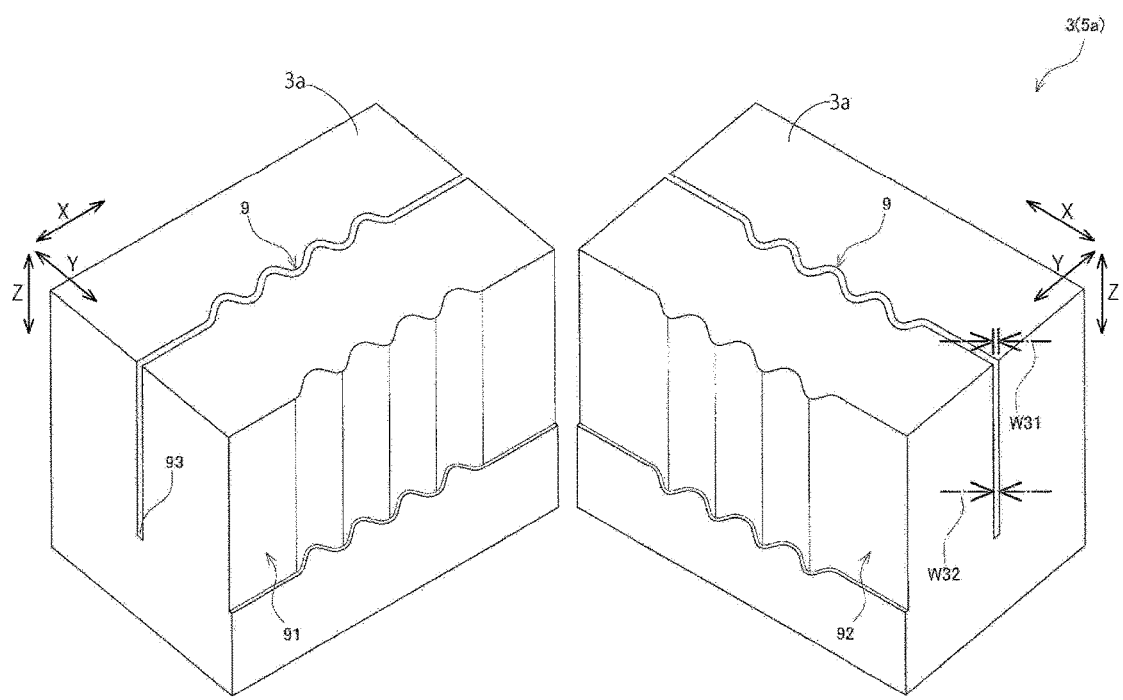

[Fig.8]
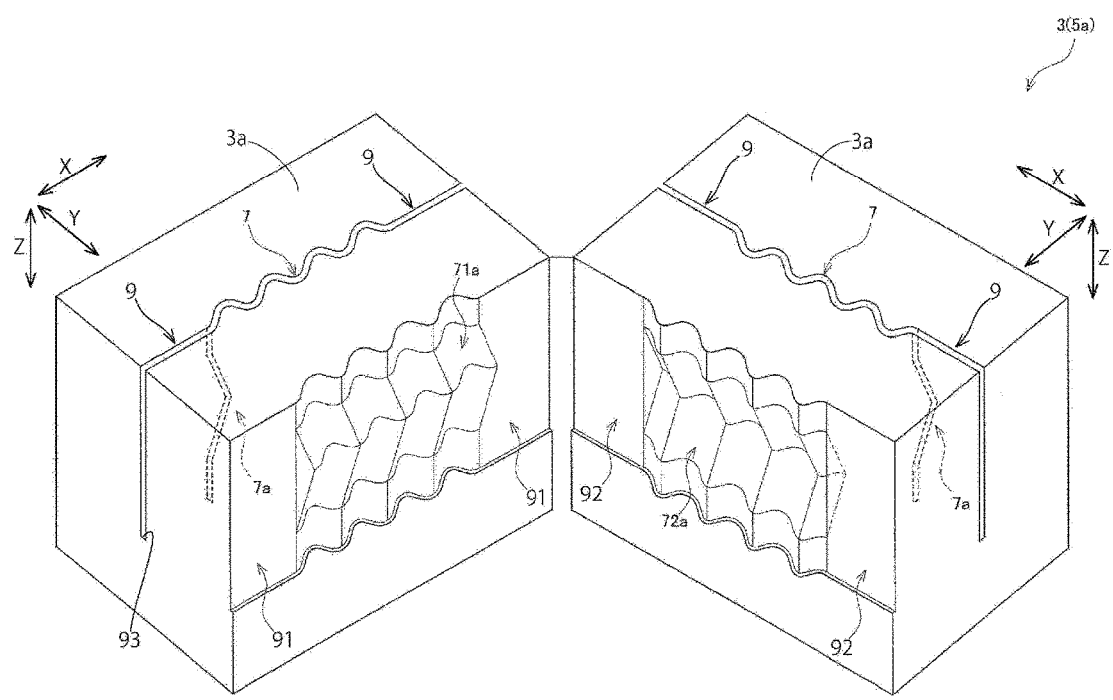

[Fig.9]
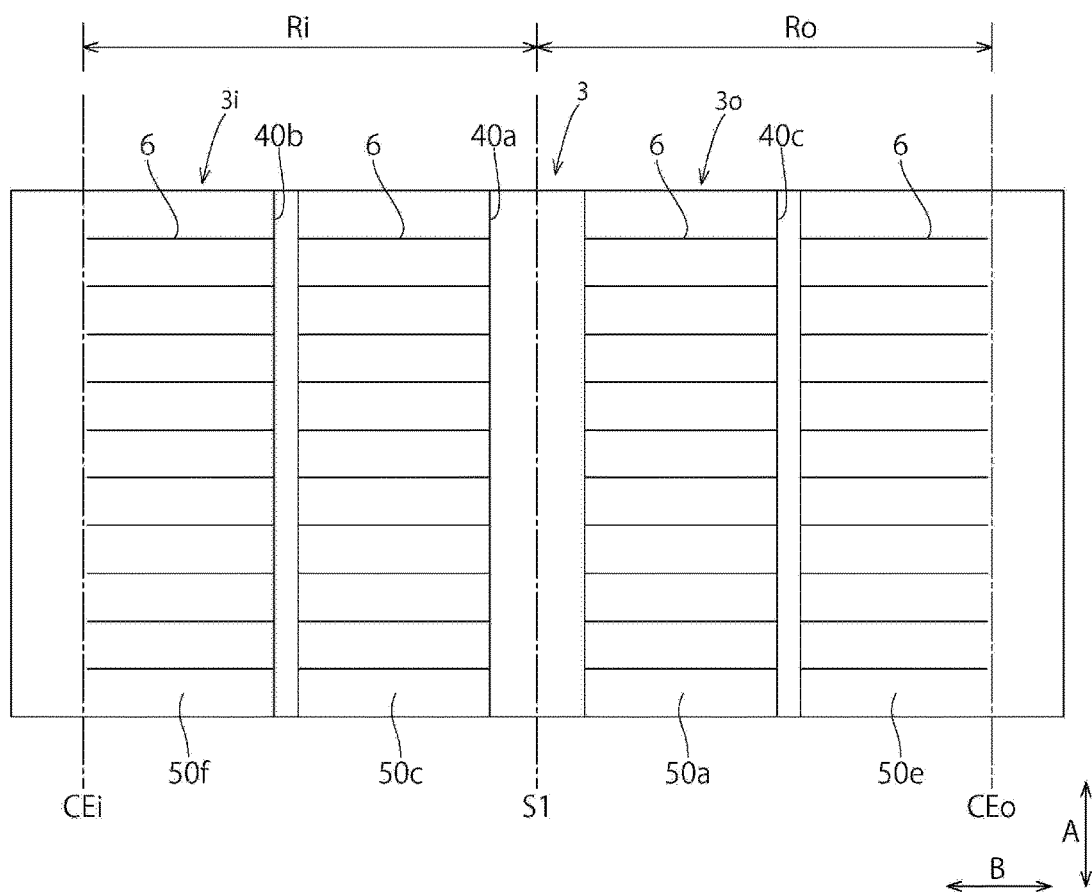

PNEUMATIC TIRE

BACKGROUND OF THE INVENTION

1. Field of the Invention

The present invention relates to a pneumatic tire.

2. Description of the Related Art

With respect to a pneumatic tire such as a studless tire or an all-season tire which is required to possess braking performance on an ice road surface having a low friction coefficient (ice braking performance), a plurality of cuts referred to as "sipes" are formed on a tread rubber. The sipes increase ice braking performance by an edge effect and a water removing effect. However, the sipes lower rigidity of a tread and hence, a large load is applied to a vehicle outer side of the tread rubber at the time of cornering of a vehicle whereby steering stability (dry steering stability performance) on a dry road surface is impaired.

On the other hand, in JP-A-2013-79015 (patent literature 1) and JP-A-2013-79017 (patent literature 2), there has been proposed a pneumatic tire which includes stereoscopic sipes as sipes formed in a tread rubber. The stereoscopic sipe has a sipe wall surface of a shape bent in a sipe width direction as viewed in cross section of the tread rubber perpendicular to a sipe length direction. The stereoscopic sipes can increase rigidity of the tread rubber while ensuring an edge effect and a water removing effect. With such a configuration, the pneumatic tire disclosed in patent literatures 1 and 2 can acquire both ice braking performance and dry steering stability performance.

SUMMARY OF INVENTION

However, although dry steering stability performance is enhanced with the formation of the above-mentioned stereoscopic sipes on the tread rubber, rigidity of a vehicle inner side of the tread rubber is increased so that ice braking performance is lowered. Accordingly, when priority is assigned to ice braking performance as in the case of a studless tire, it is not always the case that a balance is taken between ice braking performance and dry steering stability performance.

Under such circumstances, it is an object of the present invention to provide a pneumatic tire which can enhance a balance between ice braking performance and dry steering stability performance.

A pneumatic tire according to the present invention includes a tread rubber, wherein the tread rubber includes: a vehicle inner side region disposed on an inner side of a vehicle in a state where the pneumatic tire is mounted on a vehicle; a vehicle outer side region disposed on an outer side of the vehicle in a state where the pneumatic tire is mounted on the vehicle; a plurality of first stereoscopic sipes; and a plurality of second stereoscopic sipes, the first stereoscopic sipe has a sipe wall surface of a shape bent in a sipe width direction as viewed in cross section perpendicular to a sipe length direction, the first stereoscopic sipe having a fixed sipe width over a sipe depth direction, the second stereoscopic sipe has a large width portion having a sipe width wider than a sipe width of the second stereoscopic sipe on a surface of the tread rubber in the inside of the tread rubber, a total of surface lengths of the second stereoscopic sipes formed in the vehicle inner side region is larger than a total of surface lengths of the first stereoscopic sipes formed in the vehicle inner side region, a total of surface lengths of the first stereoscopic sipes formed in the vehicle outer side region is larger than a total of surface lengths of the second stereoscopic sipes formed in the vehicle outer side region, and rubber hardness of the tread rubber in the vehicle outer side region is larger than rubber hardness of the tread rubber in the vehicle inner side region.

According to the present invention, it is possible to enhance dry steering stability performance while suppressing lowering of ice braking performance thus enhancing a balance between ice braking performance and dry steering stability performance.

BRIEF DESCRIPTION OF DRAWINGS

FIG. 1 is a cross-sectional view of a pneumatic tire according to one embodiment taken along a tire radial direction;

FIG. 2 is an exploded view of a main part of a surface of a tread rubber of the pneumatic tire according to the embodiment;

FIG. 3 is a perspective view of a land portion having first stereoscopic sipes and is a view taken along a sipe bottom surface;

FIG. 4 is a side view of the land portion having the first stereoscopic sipe;

FIG. 5 is a perspective view of a land portion having second stereoscopic sipes and is a view taken along a sipe bottom surface;

FIG. 6 is a side view of the land portion having the second stereoscopic sipe;

FIG. 7 is a perspective view of a land portion having planar sipes and is a view taken along a sipe bottom surface;

FIG. 8 is a perspective view of a land portion having sipes according to a modification and is also a view taken along a sipe bottom surface; and FIG. 9 is an exploded view of a main part of a surface of a tread rubber of the pneumatic tire according to the embodiment and a comparison example.

DESCRIPTION OF PREFERRED EMBODIMENTS

Hereinafter, a pneumatic tire according to one embodiment of the present invention is described with reference to FIG. 1 to FIG. 7. In respective views (also in FIG. 8 and FIG. 9), a size rate in the drawing does not always agree with an actual size rate.

As shown in FIG. 1, a pneumatic tire (hereinafter also simply referred to as "tire") 1 according to this embodiment is a vehicle-use pneumatic radial tire. The pneumatic tire 1 includes: a tread portion 2; a pair of left and right side wall portions 12 which extends towards the inside in a radial direction from both edges of the tread portion 2; and a pair of left and right bead portions 11 disposed inside the side wall portions 12 in the radial direction. An annular bead core 11a is embedded in each of the pair of bead portions 11. At least one sheet of carcass ply 13 which extends between the pair of bead portions 11 in a straddling manner is embedded in the tire 1. In the drawing, symbol S1 indicates a tire equator surface which is an imaginary plane passing through the center of the tire 1 in a tire width direction, and symbols CEo, CEi indicate ground contact edges.

The tire 1 of this embodiment has an asymmetrical structure with respect to the tire equator surface S1. Further, the tire 1 is a tire whose mounting direction on a vehicle is designated. At the time of mounting the tire 1 on a rim 100, it is designated which side of the tire 1 is to be made to face a vehicle out of the left and right sides of the tire 1.

The direction that the tire 1 is mounted on the vehicle is indicated on the side wall portion 12, for example. To be more specific, on one side wall portion 12 disposed on an inner side of the vehicle (the left side in FIG. 1, hereinafter, also referred to as "vehicle inner side") in a state where the tire is mounted on the vehicle, an indication (for example, "INSIDE" or the like) which indicates that the side is the vehicle inner side is made. On the other hand, on the other side wall portion 12 disposed on an outer side of the vehicle (the right side in FIG. 1, hereinafter, also referred to as "vehicle outer side") in a state where the tire is mounted on the vehicle, an indication (for example, "OUTSIDE" or the like) which indicates that the side is the vehicle outer side is made.

The carcass ply 13 extends from the tread portion 2 to the bead portions 11 through the side wall portions 12, and is engaged with the bead portions 11 in a folded manner from the inside to the outside in the tire axial direction around the bead core 11a. The carcass ply 13 is formed by arranging carcass cords made of organic fiber cords or the like in a direction substantially perpendicular to the tire circumferential direction. Between a body and the folded-back portion of the carcass ply 13, a bead filler 11b made of hard rubber having a triangular cross-sectional shape is disposed on an outer peripheral side of the bead core 11a in the radial direction.

An inner liner layer 15 for maintaining an air pressure is disposed on a tire inner surface side of the carcass ply 13. The inner liner layer 15 is formed on an entire tire inner surface.

A belt 14 is disposed in the tread portion 2 on an outer peripheral side (an outer side in the tire radial direction) of the carcass ply 13. The belt 14 is mounted on an outer periphery of a crown portion of the carcass ply 13 in an overlapping manner. The belt 14 is formed of at least two belt plies.

The tread portion 2 has a tread rubber 3 which forms a ground contact surface 3a which is brought into contact with a ground surface. The tread rubber 3 is divided to a vehicle inner side region Ri disposed on a vehicle inner side in a tire width direction and a vehicle outer side region Ro disposed on a vehicle outer side in the tire width direction. The vehicle inner side region Ri is a region disposed on a vehicle inner side in a state where the ground contact surface 3a is divided in two in the tire width direction with respect to the tire equator surface S1. The vehicle outer side region Ro is a region disposed on a vehicle outer side in a state where the ground contact surface 3a is divided in two in the tire width direction with respect to the tire equator surface S1.

In the tread rubber 3, a tread rubber 3o in the vehicle outer side region Ro and a tread rubber 3i in the vehicle inner side region Ri are respectively made of rubber compositions having different hardness. To be more specific, rubber hardness (Ho) of the tread rubber 3o in the vehicle outer side region Ro is larger than rubber hardness (Hi) of the tread rubber 3i in the vehicle inner side region Ri. As one example, rubber hardness (Hi) of the tread rubber 3i may be set to a value which falls within a range of from 45 to 55 inclusive, for example. On the other hand, rubber hardness (Ho) of the tread rubber 3o may be set to a value which falls within a range of from 46 to 65 inclusive, for example. It is preferable that the difference between both rubber hardnesses (Ho−Hi) be set to a value which falls within a range of from 1 to 10 inclusive.

In this specification, rubber hardness is a value which is measured by a type-A durometer in accordance with JIS K6253 (durometer hardness) in a temperature atmosphere of 23° C.

A method of making such difference in hardness as described above is not particularly limited. For example, a kind of rubber component used in rubber composition may be made different between the rubber composition for forming the tread rubber 3o in the vehicle outer side region Ro and the rubber composition for forming the tread rubber 3i in the vehicle inner side region Ri. Further, rubber hardness may be increased by increasing an amount of filler such as carbon black or silica. Still further, rubber hardness may be increased by increasing an amount of vulcanization agent or a vulcanization accelerator.

In this embodiment, as shown in FIG. 1, the tread rubber 3o in the vehicle outer side region Ro is configured such that a boundary surface of the tread rubber 3o with the tread rubber 3i approaches the belt 14 as the boundary surface extends toward the vehicle inner side, and the tread rubber 3i in the vehicle inner side region Ri is configured such that a boundary surface of the tread rubber 3i with the tread rubber 3o approaches the ground contact surface 3a as the boundary surface extends toward the vehicle outer side. In this manner, the boundary surface between the tread rubber 3i and the tread rubber 3o may be disposed on both sides of the tire equator surface S1 in a straddling manner.

Although not particularly shown in the drawing, a base rubber made of a rubber composition of a kind different from a rubber composition for forming the tread rubber 3 may be disposed on an inner side of the tread rubber 3 in the tire radial direction substantially over the whole length in the tire width direction.

The ground contact surface 3a of the tread rubber 3 is a surface of the tread portion 2 which is brought into contact with a road surface in a state where the tire 1 is assembled to a normal rim 100, the tire 1 is vertically placed on a flat road surface with the tire 1 filled with air at a normal internal pressure, and a normal load is applied to the tire 1. The ground contact edges CEi, CEo are respectively outermost positions on the ground contact surface of the tread portion 2 in the tire width direction in such a state.

The normal rim is, in a standard system including standards in accordance with which the tires are manufactured, a rim which the standard prescribes for each tire. For example, the normal rim is a standard rim in case of JATMA, "Design Rim" in case of TRA, and a "Measuring Rim" in case of ETRTO.

The normal internal pressure is, in a standard system including standards in accordance with which tires are manufactured, an air pressure which each standard prescribes for each tire. The normal internal pressure is a maximum air pressure in case of JATMA, a maximum valve described in Table "TIRE LOAD LIMITS AT VARIOUS COLD INFLATION PRESSURES" in case of TRA, and "INFLATION PRESSURE" in case of ETRTO. When the tire is a vehicle-use tire, the normal internal pressure is set to 180 KPa. The normal load is, in a standard system including standards in accordance with which tires are manufactured, a load which each standard prescribes for each tire. The normal load is a maximum load capacity in case of JATMA, a maximum value described in the above-mentioned table in case of TRA, and "LOAD CAPACITY" in case of ETRTO. When the tire is a vehicle-use tire, the normal load is set to 85% of a load corresponding to the internal pressure of 180 KPa.

The tread rubber 3 includes a plurality of grooves 4 which are formed on the ground contact surface 3a, and a plurality of land portions 5 which are defined by the grooves 4.

To be more specific, as shown in FIG. 2, five circumferential grooves 4a, 4b, 4c, 4d, 4e extending in a tire circumferential direction A are formed on the tread rubber 3 at intervals in a tire width direction B. The tread rubber 3 is divided into six land portions 5a, 5b, 5c, 5d, 5e, 5f extending in the circumferential direction by these circumferential grooves 4a, 4b, 4c, 4d, 4e.

Out of six land portions 5a, 5b, 5c, 5d, 5e, 5f described above, the land portion 5b which is defined by the circumferential groove 4b and the circumferential groove 4c and is positioned at a center portion in the tire width direction is referred to as a center land portion 5b. The land portion 5e which is defined by the circumferential groove 4a disposed on a vehicle outermost side and the ground contact edge CEo on a vehicle outer side and is positioned at a vehicle outer end portion is referred to as an outer shoulder land portion 5e. The land portion 5f which is defined by the circumferential groove 4e disposed on a vehicle innermost side and the ground contact edge CEi on a vehicle inner side and is positioned at a vehicle inner end portion is referred to as an inner shoulder land portion 5f. The land portion 5a which is positioned between the center land portion 5b and the outer shoulder land portion 5e is referred to as an outer mediate land portion 5a. The land portion 5c which is disposed adjacently to the center land portion 5b with the circumferential groove 4c sandwiched therebetween is referred to as a first inner mediate land portion 5c. The land portion 5d which is positioned between the first inner mediate land portion 5c and the inner shoulder land portion 5f is referred to as a second inner mediate land portion 5d. In this embodiment, the center land portion 5b is formed in the vehicle inner side region Ri and in the vehicle outer side region Ro in a straddling manner over the tire equator surface S1.

On the land portions 5a, 5b, 5c, 5d, 5e, 5f, a plurality of lateral grooves 4f extending in a direction intersecting with the tire circumferential direction A are respectively formed at intervals in the tire circumferential direction A. Each land portion 5a, 5b, 5e, 5f is divided in the tire circumferential direction A by the lateral grooves 4f thus forming a block row where a plurality of blocks are arranged in row in the tire circumferential direction A. The lateral grooves 4f formed in the land portions 5c, 5d extend from the circumferential grooves 4c, 4e to the inside of the land portions 5c, 5d, and are terminated at the middle portions of the land portions 5c, 5d without being communicated with the circumferential groove 4d respectively. With such a configuration, the land portions 5c, 5d are respectively formed into a rib shape such that the portions 5c, 5d are continuously formed in the circumferential direction.

In the tread rubber 3, a plurality of sipes 6 extending in a direction intersecting with the tire circumferential direction A are formed on the land portions 5. In this embodiment, the groove 4 is a recessed portion formed on the surface (ground contact surface 3a) of the tread rubber 3 and having a width (gap) of 1.8 mm or more. The sipe 6 is a recessed portion formed on the surface of the tread rubber 3 and having a sipe width (gap) of less than 1.8 mm.

In this embodiment, plural kinds of sipes 6 are formed in the land portions 5. In this embodiment, three kinds of sipes 6, that is, first stereoscopic sipes 7, second stereoscopic sipes 8 and planar sipes 9 are formed in the land portions 5.

As shown in FIG. 3 and FIG. 4, the first stereoscopic sipe 7 has a pair of sipe wall surfaces 71, 72 which oppositely faces each other, and a sipe bottom surface 73. One sipe wall surface 71 has projecting portions 71a, and the other sipe wall surface 72 has recessed portions 72a which are configured to accommodate the projecting portions 71a while maintaining a fixed distance between the recessed portion 72a and the projecting portion 71a.

With such a configuration, sipe widths W11 to W14 of the first stereoscopic sipe 7 are set to a fixed value over the sipe depth direction Z (see FIG. 4). The first stereoscopic sipe 7 is configured such that, as viewed in cross section perpendicular to a sipe length direction (a direction that the sipe extends on the ground contact surface 3a) X, a bent portion 7a bent in the sipe width direction Y is formed by the sipe wall surfaces 71, 72. In this embodiment, the first stereoscopic sipe 7 is formed such that an opening portion formed on the surface of the tread rubber 3 extends in a corrugated shape in the sipe length direction X, and the bent portion 7a formed in the inside of the tread rubber 3 is bent at an approximately right angle.

In such a first stereoscopic sipe 7, when a load is applied to the tire 1, the projecting portion 71a and the recessed portion 72a are engaged with each other between the pair of sipe wall surfaces 71, 72 which oppositely faces each other and hence, falling of the land portion 5 can be suppressed. Accordingly, rigidity of the land portions 5 formed on the tread rubber 3 can be increased.

In this specification, "sipe widths W11 to W14 of the first stereoscopic sipe 7 are set to a fixed value over the sipe depth direction Z" includes not only the case where all sipe widths W11 to W14 are equal but also the case where the sipe widths W12 to W14 in the tread rubber 3 change within a range of from 50% to 150% of the sipe width W11 on the surface of the tread rubber 3, and preferably, within a range of from 95% to 105% of the sipe width W11.

As shown in FIG. 5 and FIG. 6, the second stereoscopic sipe 8 has a pair of sipe wall surfaces 81, 82 which oppositely faces each other, and a sipe bottom surface 83. One sipe wall surface 81 has two recessed portions 81a, 81b, and the other sipe wall surface 82 has one recessed portion 82a.

With such a configuration, the second stereoscopic sipe 8 has large width portions 8a to 8c having sipe widths W22 to W24 wider than a sipe width W21 on the surface of the tread rubber 3 in the inside of the tread rubber 3 (see FIG. 6).

The sipe widths W22 to W24 of the large width portions 8a to 8c are set to 150% or more of the sipe width W21 on the surface of the tread rubber 3, for example, and are preferably set to 200% or more of the sipe width W21 on the surface of the tread rubber 3. In this embodiment, all sipe widths W22 to W24 of the large width portions 8a to 8c are set to the same distance.

In this embodiment, the second stereoscopic sipe 8 is configured such that an opening portion formed on the surface of the tread rubber 3 extends in a corrugated shape in the sipe length direction X, and the second stereoscopic sipe 8 extends linearly in a direction (tire radial direction) perpendicular to the surface of the tread rubber 3 without being bent in the middle in the sipe depth direction Z.

The second stereoscopic sipe 8 having such a configuration has the large width portions 8a to 8c in the inside of the tread rubber 3 and hence, rigidity of the land portion 5 is lowered so that the land portion 5 is easily deflected. Further, when a load is applied to the tire 1, in the second stereoscopic sipe 8, the deformation brought about by a load is absorbed by the large width portions 8a to 8c and hence, it is possible to suppress the narrowing of the sipe width W21 on the surface of the tread rubber 3. Accordingly, the tire 1 can ensure an edge effect and a water removing effect.

As shown in FIG. 7, the planar sipe 9 has a pair of sipe wall surfaces 91, 92 which opposedly faces each other, and a sipe bottom surface 93. The pair of sipe wall surfaces 91, 92 extends linearly in a direction (tire radial direction) perpendicular to the surface of the tread rubber 3 as viewed in cross section perpendicular to the sipe length direction X. Further, the pair of sipe wall surfaces 91, 92 is disposed parallel to each other. With such a configuration, the planar sipe 9 is configured such that sipe widths W31, W32 have a fixed value over the sipe depth direction Z.

In this embodiment, with respect to the land portions positioned in the vehicle inner side region Ri of the tread rubber 3, in the first inner mediate land portion 5c, the second inner mediate land portion 5d and the inner shoulder land portion 5f, the first stereoscopic sipes 7 and the second stereoscopic sipes 8 are formed, and the number of second stereoscopic sipes 8 which lower rigidity of the land portion 5 is set larger than the number of first stereoscopic sipes 7 which increase rigidity of the land portion 5.

On the other hand, in this embodiment, with respect to the land portions positioned in the vehicle outer side region Ro of the tread rubber 3, in the outer mediate land portion 5a and the outer shoulder land portion 5e, the first stereoscopic sipes 7 and the second stereoscopic sipes 8 are formed, and the number of first stereoscopic sipes 7 which increase rigidity of the land portion 5 is set larger than the number of second stereoscopic sipes 8 which lower rigidity of the land portion 5.

Further, in the land portions positioned in the vehicle inner side region Ri as well as in the vehicle outer side region Ro of the tread rubber 3 (that is, in the whole tread rubber 3), at least one of the first stereoscopic sipes 7 and the second stereoscopic sipes 8 and the planar sipes 9 are formed in mixture. A total area of the first stereoscopic sipes 7 and second stereoscopic sipes 8 which are formed in the whole tread rubber 3 is set larger than a total area of the planar sipes 9 formed in the whole tread rubber 3.

The magnitudes in size of the first stereoscopic sipes 7, the second stereoscopic sipes 8, and the planar sipes 9 formed in the land portions 5 are compared to each other in terms of a total of surface lengths of sipes. "A total of surface lengths of sipes" means the sum obtained by adding lengths of respective sipes formed in the surface of the tread rubber 3.

To be more specific, lengths of opening portions formed on the surface of the tread rubber 3 are measured with respect to all first stereoscopic sipes 7 formed in the land portions 5c, 5d, 5f positioned in the vehicle inner side region Ri of the tread rubber 3. The length obtained by adding all obtained measured values is set as a total of surface lengths L1i of the first stereoscopic sipes 7 in the vehicle inner side region.

To obtain a total of surface lengths of the second stereoscopic sipes 8 and a total of surface lengths of the planar sipes 9 in the vehicle inner side region Ri, in the same manner as the first stereoscopic sipes 7, lengths of opening portions formed on the surface of the tread rubber 3 are measured with respect to all second stereoscopic sipes 8 and all planar sipes 9 formed in the land portions 5c, 5d, 5f positioned in the vehicle inner side region Ri of the tread rubber 3. The length obtained by adding all measured values with respect to the second stereoscopic sipes 8 is set as a total of surface lengths L2i of the second stereoscopic sipes 8 in the vehicle inner side region. The length obtained by adding all measured values with respect to the planar sipes 9 is set as a total of surface lengths L3i of the planar sipes 9 in the vehicle inner side region.

A total of surface lengths L1o of the first stereoscopic sipes 7, a total of surface lengths L2o of the second stereoscopic sipes 8, and a total of surface lengths L3o of the planar sipes 9 in the vehicle outer side region Ro are also obtained substantially in the same manner as the sipes in the vehicle inner side region Ri. That is, lengths of opening portions formed on the surface of the tread rubber 3 are measured with respect to all first stereoscopic sipes 7, all second stereoscopic sipes 8 and all planar sipes 9 formed in the land portions 5a, 5e positioned in the vehicle outer side region Ro of the tread rubber 3. Further, the length obtained by adding all obtained measured values with respect to the first stereoscopic sipes 7 is set as a total of surface lengths L1o of the first stereoscopic sipes 7 in the vehicle outer side region, the length obtained by adding all obtained measured values with respect to the second stereoscopic sipes 8 is set as a total of surface lengths L2o of the second stereoscopic sipes 8 in the vehicle outer side region, and the length obtained by adding all obtained measured values with respect to the planar sipes 9 is set as a total of surface lengths L3o of the planar sipes 9 in the vehicle outer side region.

The sipes 6 which are formed in the land portion such as the center land portion 5b which is positioned in the vehicle inner side region Ri and the vehicle outer side region Ro in a straddling manner over the tire equator surface S1 are not taken into account in calculating a total of surface lengths of sipes in the vehicle inner side region Ri and a total of surface lengths of sipes in the vehicle outer side region Ro.

As described above, in the tread rubber $3i$ in the vehicle inner side region Ri, the total of surface lengths L2i of the second stereoscopic sipes 8 is set larger than the total of surface lengths L1i of the first stereoscopic sipes 7, and the number of second stereoscopic sipes 8 is set larger than the number of first stereoscopic sipes 7.

It is preferable that a rate of a total of surface lengths L2i of the second stereoscopic sipes 8 in the vehicle inner side region Ri of the tread rubber 3 to a sum (L1i+L2i) of the total of surface lengths L1i of the first stereoscopic sipes and the total of surface lengths L2i of the second stereoscopic sipes 8 be set to a value which falls within a range of from 51% to 100%.

In this embodiment, with respect to the first inner mediate land portion 5c, the second inner mediate land portion 5d and the inner shoulder land portion 5f disposed in the vehicle inner side region Ri, a rate of the second stereoscopic sipes 8 to the stereoscopic sipes (first stereoscopic sipes and second stereoscopic sipes) formed in the land portion is set larger as the land portion is positioned closer to the ground contact edge CEi in the vehicle inner side region Ri.

That is, a rate $\rho 2f$ of the second stereoscopic sipes 8 in the inner shoulder land portion 5f disposed at a position closest to the ground contact edge CEi is larger than a rate $\rho 2c$ of the second stereoscopic sipes 8 in the first inner mediate land portion 5c and a rate $\rho 2d$ of the second stereoscopic sipes 8 in the second inner mediate land portion 5d, and a rate $\rho 2c$ of the second stereoscopic sipes 8 in the first inner mediate land portion 5c disposed at a position remotest from the ground contact edge CEi is minimum. In this case, it is preferable that a difference between the above-mentioned rates ($\rho 2f-\rho 2d$, $\rho 2d-\rho 2c$) of the second stereoscopic sipes 8 in the land portions disposed adjacently to each other in the tire width direction B be set to a value which falls within a range of from 5 to 15%.

The rate $\rho 2c$, the rate $\rho 2d$, and the rate $\rho 2f$ are expressed by the following formulae.

$$\rho 2c = L2ic/(L1ic+L2ic)$$

$$\rho 2d = L2id/(L1id+L2id)$$

$$\rho 2f = L2if/(L1if+L2if)$$

In the formulae, L1ic indicates a total of surface lengths of the first stereoscopic sipes 7 in the first inner mediate land portion 5c, L2ic indicates a total of surface lengths of the second stereoscopic sipes 8 in the first inner mediate land portion 5c, L1id indicates a total of surface lengths of the first stereoscopic sipes 7 in the second inner mediate land portion 5d, L2id indicates a total of surface lengths of the second stereoscopic sipes 8 in the second inner mediate land portion 5d, L1if indicates a total of surface lengths of the first stereoscopic sipes 7 in the inner shoulder land portion 5f, and L2if indicates a total of surface lengths of the second stereoscopic sipes 8 in the inner shoulder land portion 5f.

In the tread rubber 3o in the vehicle outer side region Ro, the total of surface lengths L1o of the first stereoscopic sipes 7 is set larger than the total of surface lengths L2o of the second stereoscopic sipes 8, and the number of first stereoscopic sipes 7 is set larger than the number of second stereoscopic sipes 8.

It is preferable that the total of surface lengths L1o of the first stereoscopic sipes 7 in the vehicle outer side region Ro of the tread rubber 3 to a sum of the total of the surface lengths L1o of the first stereoscopic sipes 7 and the total of the surface lengths L2o of the second stereoscopic sipes 8 (L1o+L2o) be set to a value which falls within a range of from 70% to 100%.

Further, in this embodiment, with respect to the outer mediate land portion 5a and the outer shoulder land portion 5e disposed in the vehicle outer side region Ro, a rate of the first stereoscopic sipes 7 to the stereoscopic sipes (first stereoscopic sipes and second stereoscopic sipes) formed in the land portion is set larger as the land portion is positioned closer to the ground contact edge CEo in the vehicle outer side region Ro.

That is, a rate $\rho 1e$ of the first stereoscopic sipes 7 in the outer shoulder land portion 5e disposed at a position closest to the ground contact edge CEo is set larger than a rate $\rho 1a$ of the first stereoscopic sipes 7 in the outer mediate land portion 5a. In this case, it is preferable that the difference in the above-mentioned rates ($\rho 1e - \rho 1a$) of the first stereoscopic sipes 7 in land portions disposed adjacently to each other in the tire width direction B be set to a value which falls within a range of from 5 to 15%.

The rate $\rho 1a$ and the rate $\rho 1e$ are expressed by the following formulae.

$$\rho 1a = L1oa/(L1oa+L2oa)$$

$$\rho 1e = L1oe/(L1oe+L2oe)$$

In the formulae, L1oa indicates a total of surface lengths of the first stereoscopic sipes 7 in the outer mediate land portion 5a, L2oa indicates a total of surface lengths of the second stereoscopic sipes 8 in the outer mediate land portion 5a, L1oe indicates a total of surface lengths of the first stereoscopic sipes 7 in the outer shoulder land portion 5e, and L2oe indicates a total of surface lengths of the second stereoscopic sipes 8 in the outer shoulder land portion 5e.

In this embodiment, a sum of the totals of surface lengths of the stereoscopic sipes 7, 8 formed in the vehicle inner side region Ri and the vehicle outer side region Ro (L1i+L1o+L2i+L2o) is set larger than a total of surface lengths of the planar sipes 9 formed in the vehicle inner side region Ri and the vehicle outer side region Ro. It is preferable that a sum of the totals of surface lengths of the stereoscopic sipes 7, 8 to a sum of totals of surface lengths of the stereoscopic sipes 7, 8 and a total of surface lengths of the planar sipes 9 be set to a value which falls within a range of from 80% to 100%.

In the tire 1 of the above-mentioned embodiment, in addition to the configuration that rubber hardness of the tread rubber 3o in the vehicle outer side region Ro is set larger than rubber hardness of the tread rubber 3i in the vehicle inner side region Ri, in the land portions 5c, 5d, 5f positioned in the vehicle inner side region Ri of the tread rubber 3, the first stereoscopic sipes 7 and the second stereoscopic sipes 8 which lower rigidity of the land portion are formed such that the number of second stereoscopic sipes 8 is set larger than the number of first stereoscopic sipes 7. With such a configuration, the first stereoscopic sipes 7 which increase rigidity of the land portion are formed in the land portions 5a, 5e positioned in the vehicle outer side region Ro of the tread rubber 3 larger in number than the second stereoscopic sipes 8. Accordingly, as described hereinafter, steering stability on a dry road surface can be enhanced while suppressing lowering of braking performance on an ice road surface, and a balance between ice braking performance and dry steering stability performance can be enhanced.

That is, in general, the tire 1 is mounted on the vehicle with a camber angle by which the pneumatic time 1 is inclined toward a vehicle inner side in a direction from a lower side to an upper side. Accordingly, the larger load is applied to the vehicle inner side region Ri of the tread rubber 3 at the time of performing braking compared to the vehicle outer side region Ro of the tread rubber 3. In the tire 1 of this embodiment, rubber hardness of the tread rubber 3i in the vehicle inner side region Ri is set lower than rubber hardness of the tread rubber 3o in the vehicle outer side region Ro, and a larger number of second stereoscopic sipes 8 which lower rigidity of the land portion are formed in the vehicle inner side region Ri compared to the number of first stereoscopic sipes 7 which enhance rigidity of the land portion. Accordingly, the land portions 5c, 5d, 5f in the vehicle inner side region Ri are easily deflected and hence, a ground contact area in the vehicle inner side region Ri can be increased. Further, the second stereoscopic sipe 8 absorbs the deformation of the land portion by the large width portions 8a to 8c, and the ripe width W21 on the surface of the tread rubber 3 is minimally narrowed and hence, even when the land portions 5c, 5d, 5f are deflected, the tire 1 can ensure an edge effect and a water removing effect. That is, in the tire 1 of this embodiment, the ground contact area in the vehicle inner side region Ri can be increased while maintaining the edge effect and the water removing effect by the sipes 6 at the time of performing braking and hence, the braking performance on an ice road surface can be enhanced.

A load applied to the land portion at the time of performing braking becomes larger as the land portion is positioned closer to the ground contact edge CEi in the vehicle inner side region Ri, that is, as the land portion is positioned closer to a vehicle inner side. In the tire 1 of this embodiment, a rate of the second stereoscopic sipes 8 to the stereoscopic sipes 7, 8 formed in the land portion is set larger so as to increase the ground contact area of the land portion as the land portion is positioned closer to the ground contact edge CEi. Accordingly, the braking performance on an ice road surface can be further enhanced.

When the tire 1 is brought into contact with a road, an in-plane contraction force directed toward the center portion of the tire 1 in the tire width direction is applied to the tread rubber 3o in the vehicle outer side region Ro so that ground contact performance and road surface followability of the tread rubber 3o are liable to be deteriorated. However, in the tire 1 of this embodiment, rubber hardness of the tread rubber 3o in the vehicle outer side region Ro is larger than rubber hardness of the tread rubber 3i in the vehicle inner side region Ri, and a larger number of first stereoscopic sipes 7 which increase rigidity of the land portion are formed in the vehicle outer side region Ro compared to the number of second stereoscopic sipes 8 which lower rigidity of the land portion so that rigidity of the land portion in the vehicle outer side region Ro is increased. Accordingly, the deterioration of ground contact performance and road surface followability brought about by the in-plane contraction force can be suppressed whereby it is possible to enhance steering stability on a dry road surface.

When the vehicle turns on a dry road surface, a large load is applied to the vehicle outer side region Ro of the tire 1 which becomes an outer wheel (a wheel disposed on an outer side at the time of turning of the vehicle). In the tire 1 of this embodiment, as described above, rigidity of the tread rubber 3o in the vehicle outer side region Ro is set larger than that of the tread rubber 3i in the vehicle inner side region Ri. Accordingly, it is possible to suppress the deformation of the tread rubber 3 in the vehicle outer side region Ro at the time of turning of the vehicle thus also enhancing turning performance of the vehicle on a dry road surface.

Further, an in-plane contraction force generated when the tire 1 is brought into contact with a road surface and a load generated when the vehicle turns become larger as the land portion is positioned closer to the ground contact edge CEo in the vehicle outer side region Ro, that is, as the land portion is positioned closer to the outside of the vehicle. In the tire 1 of this embodiment, a rate of the first stereoscopic sipes 7 to the stereoscopic sipes 7, 8 formed in the land portion is set larger as the land portion is positioned closer to the ground contact edge CEo. Accordingly, rigidity of the land portion can be increased and hence, steering stability on a dry road surface can be further enhanced.

Modification

In the above-mentioned embodiment, as shown in FIG. 3, FIG. 5 and FIG. 7, the description is made with respect to the case where the continuous sipe 7, 8, 9 is formed of the same kind of sipe over the whole length in the sipe length direction. However, the present invention is not limited to such a configuration. As exemplified in FIG. 8, the kind of the sipe may be changed in the sipe length direction X. That is, in the case shown in FIG. 8, the planar sipes 9 are formed in the land portion 5 such that the planar sipes 9 are continuously connected to both ends of the first stereoscopic sipe 7 in the sipe length direction X. Although not shown in the drawing, a sipe formed by connecting the first stereoscopic sipe 7 and the second stereoscopic sipe 8 to each other may be formed in the land portion 5 or a sipe formed by connecting the second stereoscopic sipe 8 and the planar sipe 9 to each other may be formed in the land portion 5.

In this manner, when one continuous sipe is formed of plural kinds of sipes, a total of surface lengths of the sipe can be obtained by dividing one sipe into sipes for respective kinds and, thereafter, by adding surface lengths of divided sipes for respective kinds.

Other configuration and advantageous effects of the modification are substantially equal to those of the first embodiment and hence, the description of the other configuration and the advantageous effects is omitted.

Although the embodiment of the present invention has been described heretofore, the above-mentioned embodiment has been proposed as an example, and the embodiment is not intended to restrict the scope of the present invention. This novel embodiment can be carried out in other various modes, and various omissions, replacements and changes can be made without departing from the gist of the present invention.

Example

To confirm the advantageous effects of the above-mentioned embodiment, the ice braking performance and the dry steering stability performance were evaluated with respect to tires (tire size: 195/65R15, air pressure: 220 KPa) according to examples and comparison examples.

As shown in FIG. 9, the tires according to the examples 1 to 4 and the comparison examples 1 to 6 respectively include: a circumferential groove 40a formed on a tread rubber 3 and disposed on a tire equator surface S1; a circumferential groove 40b formed on the tread rubber 3 and disposed in a vehicle inner side region Ri, and a circumferential groove 40c formed on the tread rubber 3 and disposed in a vehicle outer side region Ro.

In the tires according to the examples 1 to 4 and the comparison examples 1 to 6, an inner mediate land portion 50c defined between the circumferential groove 40a and the circumferential groove 40b and an inner shoulder land portion 50f defined between the circumferential groove 40b and a ground contact edge CEi in the vehicle inner side region Ri are positioned in the vehicle inner side region Ri. On the other hand, an outer mediate land portion 50a defined between the circumferential groove 40a and the circumferential groove 40c and an outer shoulder land portion 50e defined between the circumferential groove 40c and a ground contact edge CEo of the vehicle outer side region Ro are disposed in the vehicle outer side region Ro.

In the tires according to the examples 1 to 4 and the comparison examples 1 to 6, the first stereoscopic sipes 7 shown in FIG. 3, the second stereoscopic sipes 8 shown in FIG. 5, and the planar sipes 9 shown in FIG. 7 are formed on the respective land portions 50a, 50c, 50e, 50f with rates shown in the following Table 1, and rubber hardness of the tread rubber 3o in the vehicle outer side region Ro and rubber hardness of the tread rubber 3i in the vehicle inner side region Ri are set to rubber hardness shown in the following Table 1 respectively.

The tires according to the examples 1 to 4 and the comparison examples 1 to 6 differ from each other in a rate of the first stereoscopic sipes 7, a rate of the second stereoscopic sipes 8, a rate of the planar sipes 9, and hardness of rubber which forms the tread rubber 3. However, these tires are equal with respect to other configurations. Further, the tires according to the examples 1 to 4 and the comparison examples 1 to 6 have the same internal structures as the internal structure of the tire 1 of the above-mentioned embodiment shown in FIG. 1 and FIG. 2.

The respective evaluation methods are as follows.

Ice Braking Performance

Each one of the respective tires according to the examples 1 to 4 and the comparison examples 1 to 6 was mounted on a test vehicle (1500 cc, 4 WD middle sedan-type vehicle), the vehicle was made to move on an ice road surface, and an inverse number of a braking distance when a braking force is applied to the tire at a vehicle speed of 40 km/h so as to operate ABS was evaluated. The evaluation is indicated by an index with the result of the comparison example 1 set as 100. The larger a numerical value of the index, the more excellent the braking performance on an ice road surface becomes.

Dry Steering Stability Performance

Each one of the respective tires according to the examples 1 to 4 and the comparison examples 1 to 6 was mounted on a test vehicle (1500 cc, 4 WD middle sedan-type vehicle), the vehicle was made to move on a dry road surface, and sensory evaluation points with respect to acceleration, braking, turning, and lane changing were respectively expressed as indexes. The larger the numerical value of the index, the more favorable the steering stability performance on a dry road surface becomes.

mediate land portion 50c, the inner shoulder land portion 50f, the outer mediate land portion 50a, and the outer shoulder land portion 50e is a rate of the first stereoscopic sipes to a sum of a total of surface lengths of the first stereoscopic sipes formed in the respective land portions and a total of the second stereoscopic sipes formed in the respective land portions. A rate of the second stereoscopic sipes in the inner mediate land portion 50c, the inner shoulder land portion 50f, the outer mediate land portion 50a, and the outer shoulder land portion 50e is a rate of the second stereoscopic sipes to a sum of a total of surface lengths of the first stereoscopic sipes formed in the respective land portions and a total of surface lengths of the second stereoscopic sipes formed in the respective land portions.

The evaluation results are shown in Table 1. In the comparison example 1, the stereoscopic sipes 7, 8 are not formed and only the planar sipes 9 are formed. In the

TABLE 1

| | | Comparison Example 1 | Comparison Example 2 | Comparison Example 3 | Comparison Example 4 | Comparison Example 5 | Comparison Example 6 | Example 1 | Example 2 | Example 3 | Example 4 | Example 5 | Example 6 |
|---|---|---|---|---|---|---|---|---|---|---|---|---|---|
| Rate of planar sipes (%) | | 100 | 80 | 20 | 80 | 20 | 20 | 20 | 10 | 0 | 0 | 20 | 20 |
| Rate of stereoscopic sipes (%) | | 0 | 20 | 80 | 20 | 80 | 80 | 80 | 90 | 100 | 100 | 80 | 80 |
| Inner mediate land portion | Rate of first stereoscopic sipes (%) | 0 | 100 | 100 | 0 | 0 | 20 | 30 | 30 | 30 | 20 | 30 | 30 |
| | Rate of second stereoscopic sipes (%) | 0 | 0 | 0 | 100 | 100 | 80 | 70 | 70 | 70 | 80 | 70 | 70 |
| Inner shoulder land portion | Rate of first stereoscopic sipes (%) | 0 | 100 | 100 | 0 | 0 | 20 | 15 | 15 | 15 | 10 | 15 | 30 |
| | Rate of second stereoscopic sipes (%) | 0 | 0 | 0 | 100 | 100 | 80 | 85 | 85 | 85 | 90 | 85 | 70 |
| Outer mediate land portion | Rate of first stereoscopic sipes (%) | 0 | 100 | 100 | 0 | 0 | 80 | 70 | 70 | 70 | 80 | 70 | 70 |
| | Rate of second stereoscopic sipes (%) | 0 | 0 | 0 | 100 | 100 | 20 | 30 | 30 | 30 | 20 | 30 | 30 |
| Outer shoulder land portion | Rate of first stereoscopic sipes (%) | 0 | 100 | 100 | 0 | 0 | 80 | 85 | 85 | 85 | 90 | 70 | 85 |
| | Rate of second stereoscopic sipes (%) | 0 | 0 | 0 | 100 | 100 | 20 | 15 | 15 | 15 | 10 | 30 | 15 |
| Rubber hardness in vehicle inner side region | | 50 | 50 | 50 | 50 | 50 | 55 | 50 | 50 | 50 | 50 | 50 | 50 |
| Rubber hardness in vehicle outer side region | | 60 | 60 | 60 | 60 | 60 | 55 | 60 | 60 | 60 | 60 | 60 | 60 |
| Ice braking performance | | 100 | 101 | 101 | 102 | 102 | 101 | 104 | 106 | 107 | 108 | 104 | 103 |
| Dry steering stability performance | | 100 | 101 | 101 | 99 | 99 | 101 | 103 | 104 | 105 | 106 | 102 | 103 |

In Table 1, a rate of the planar sipes is a rate of a total of surface lengths of the planar sipes 9 to a sum of the totals of surface lengths of all of the sipes 7, 8, 9 formed in the land portions 50a, 50c, 50e, and 50f. A rate of the stereoscopic sipes is a rate of a total of surface lengths of the stereoscopic sipes 7, 8 to a sum of the totals of surface lengths of all of the sipes 7, 8, 9 formed in the land portions 50a, 50c, 50e, and 50f. A rate of the first stereoscopic sipes in the inner comparison examples 2, 3, the second stereoscopic sipes 8 are not formed and the planar sipes 9 and the first stereoscopic sipes 7 are formed. In the comparison examples 4, 5, the first stereoscopic sipes 7 are not formed and the planar sipes 9 and the second stereoscopic sipes 8 are formed. In the comparison example 6, the tread rubber 3o in the vehicle outer side region Ro is configured to have the same rubber hardness as the tread rubber 3i in the vehicle inner side region Ri. Compared with such comparison example, in the examples 1 to 4, rubber hardness of the tread rubber 3o in the vehicle outer side region Ro is set larger than rubber hardness of the tread rubber 3i in the vehicle inner side region Ri. In the vehicle inner side region Ri, a larger number of second stereoscopic sipes 8 are formed in the inner mediate land portion 50c and the inner shoulder land portion 50f compared to the number of first stereoscopic sipes 7. Further, a larger number of first stereoscopic sipes 7 are formed in the outer mediate land portion 5a and the outer shoulder land portion 50e positioned in the vehicle outer side region Ro compared to the number of second stereoscopic sipes 8. Accordingly, the tires of the examples 1 to 4 can enhance the steering stability performance on a dry road surface while suppressing lowering of the braking performance on an ice road surface.

What is claimed is:

1. A pneumatic tire comprising a tread rubber, wherein the tread rubber includes: a vehicle inner side region disposed on an inner side of the pneumatic tire in a state where the pneumatic tire is mounted on a vehicle; a vehicle outer side region disposed on an outer side of the pneumatic tire in a state where the pneumatic tire is mounted on the vehicle; a plurality of first stereoscopic sipes; and a plurality of second stereoscopic sipes, the first stereoscopic sipe has a sipe wall surface of a shape bent in a sipe width direction as viewed in cross section perpendicular to a sipe length direction, the first stereoscopic sipe having a fixed sipe width over a sipe depth direction, the second stereoscopic sipe has a large width portion having a sipe width wider than a sipe width of the second stereoscopic sipe on a surface of the tread rubber in the inside of the tread rubber, a total of surface lengths of the second stereoscopic sipes formed in the vehicle inner side region is larger than a total of surface lengths of the first stereoscopic sipes formed in the vehicle inner side region, a total of surface lengths of the first stereoscopic sipes formed in the vehicle outer side region is larger than a total of surface lengths of the second stereoscopic sipes formed in the vehicle outer side region, and rubber hardness of the tread rubber in the vehicle outer side region is larger than rubber hardness of the tread rubber in the vehicle inner side region;

wherein the tread rubber has: a plurality of main grooves extending in a tire circumferential direction in the vehicle inner side region; and a plurality of land portions formed between the main grooves and having the first stereoscopic sipes and the second stereoscopic sipes, and the land portions disposed in the vehicle inner side region are configured such that a second rate which is a rate of the total of surface lengths of the second stereoscopic sipes to a sum of the total of surface lengths of the first stereoscopic sipes and the total of surface lengths of the second stereoscopic sipes is set larger as the land portion is positioned closer to a ground contact edge.

2. The pneumatic tire according to claim 1, wherein the tread rubber has: a plurality of main grooves extending in a tire circumferential direction in the vehicle outer side region; and a plurality of land portions formed between the main grooves and having the first stereoscopic sipes and the second stereoscopic sipes, and the land portions disposed in the vehicle outer side region are configured such that a first rate which is a rate of the total of surface lengths of the first stereoscopic sipes to a sum of the total of surface lengths of the first stereoscopic sipes and the total of surface lengths of the second stereoscopic sipes is set larger as the land portion is positioned closer to a ground contact edge.

3. The pneumatic tire according to claim 2, wherein the tread rubber has a plurality of planar sipes, the planar sipe has a sipe wall surface of a linear shape as viewed in cross section perpendicular to the sipe length direction, and a sum of the total of surface lengths of the first stereoscopic sipes formed in the tread rubber and the total of surface lengths of the second stereoscopic sipes is larger than a total of surface lengths of the planar sipes formed in the tread rubber.

4. The pneumatic tire according to claim 1, wherein the land portions disposed in the vehicle inner side region are configured such that difference in the second rate of the land portions disposed adjacently to each other in the tire width direction is set to a value which falls within a range of from 5 to 15%.

5. The pneumatic tire according to claim 4, wherein the tread rubber has a plurality of planar sipes, the planar sipe has a sipe wall surface of a linear shape as viewed in cross section perpendicular to the sipe length direction, and a sum of the total of surface lengths of the first stereoscopic sipes formed in the tread rubber and the total of surface lengths of the second stereoscopic sipes is larger than a total of surface lengths of the planar sipes formed in the tread rubber.

6. The pneumatic tire according to claim 1, wherein the tread rubber has a plurality of planar sipes, the planar sipe has a sipe wall surface of a linear shape as viewed in cross section perpendicular to the sipe length direction, and a sum of the total of surface lengths of the first stereoscopic sipes formed in the tread rubber and the total of surface lengths of the second stereoscopic sipes is larger than a total of surface lengths of the planar sipes formed in the tread rubber.

7. A pneumatic tire comprising a tread rubber, wherein the tread rubber includes: a vehicle inner side region disposed on an inner side of the pneumatic tire in a state where the pneumatic tire is mounted on a vehicle; a vehicle outer side region disposed on an outer side of the pneumatic tire in a state where the pneumatic tire is mounted on the vehicle; a plurality of first stereoscopic sipes; and a plurality of second stereoscopic sipes, the first stereoscopic sipe has a sipe wall surface of a shape bent in a sipe width direction as viewed in cross section perpendicular to a sipe length direction, the first stereoscopic sipe having a fixed sipe width over a sipe depth direction, the second stereoscopic sipe has a large width portion having a sipe width wider than a sipe width of the second stereoscopic sipe on a surface of the tread rubber in the inside of the tread rubber, a total of surface lengths of the second stereoscopic sipes formed in the vehicle inner side region is larger than a total of surface lengths of the first stereoscopic sipes formed in the vehicle inner side region, a total of surface lengths of the first stereoscopic sipes formed in the vehicle outer side region is larger than a total of surface lengths of the second stereoscopic sipes formed in the vehicle outer side region, and rubber hardness of the tread rubber in the vehicle outer side region is larger than rubber hardness of the tread rubber in the vehicle inner side region, wherein the tread rubber has: a plurality of main grooves extending in a tire circumferential direction in the vehicle outer side region; and a plurality of land portions formed between the main grooves and having the first stereoscopic sipes and the second stereoscopic sipes, and the land portions disposed in the vehicle outer side region are configured such that a first rate which is a rate of the total of surface lengths of the first stereoscopic sipes to a sum of the total of surface lengths of the first stereoscopic sipes and the total of surface lengths of the second stereoscopic sipes is set larger as the land portion is positioned closer to a ground contact edge.

8. The pneumatic tire according to claim 7, wherein the land portions disposed in the vehicle outer side region are configured such that difference in the first rate of the land portions disposed adjacently to each other in the tire width direction is set to a value which falls within a range of from 5 to 15%.

9. The pneumatic tire according to claim 8, wherein the tread rubber has a plurality of planar sipes, the planar sipe has a sipe wall surface of a linear shape as viewed in cross section perpendicular to the sipe length direction, and a sum of the total of surface lengths of the first stereoscopic sipes formed in the tread rubber and the total of surface lengths of the second stereoscopic sipes is larger than a total of surface lengths of the planar sipes formed in the tread rubber.

10. The pneumatic tire according to claim 7, wherein the tread rubber has a plurality of planar sipes, the planar sipe has a sipe wall surface of a linear shape as viewed in cross section perpendicular to the sipe length direction, and a sum of the total of surface lengths of the first stereoscopic sipes formed in the tread rubber and the total of surface lengths of the second stereoscopic sipes is larger than a total of surface lengths of the planar sipes formed in the tread rubber.

\* \* \* \* \*